Sept. 11, 1951 B. LJUNGSTRÖM 2,567,490
TAIL-MOUNTED JET PROPULSION UNIT FOR AIRCRAFT
Filed May 14, 1947
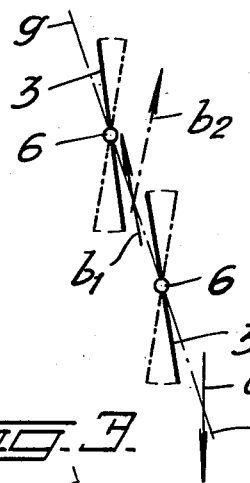
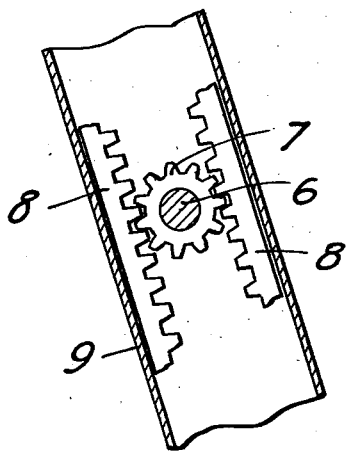
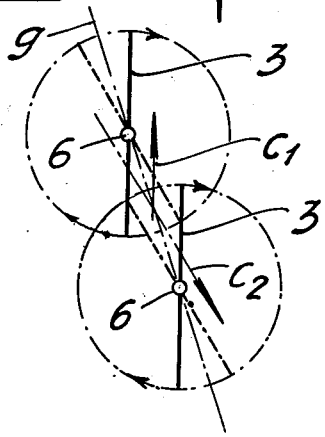
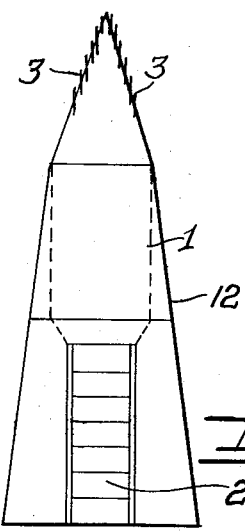
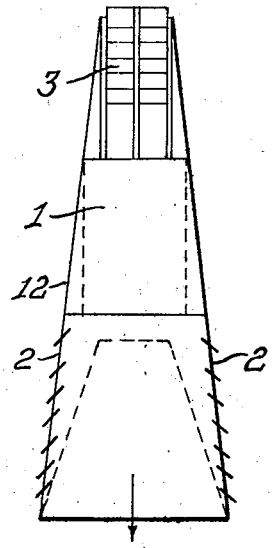
Inventor
Birger Ljungström
by Sommers & Young
Attorneys Patented Sept. 11, 1951

2,567,490

UNITED STATES PATENT OFFICE 2,567,490

TAIL-MOUNTED JET PROPULSION UNIT FOR AIRCRAFT

Birger Ljungström, Stockholm, Sweden

Application May 14, 1947, Serial No. 747,890
In Sweden May 9, 1946

1 Claim. (Cl. 244—74)

The present invention relates to jet propulsion units and more particularly to controlling devices for such units, the object of the invention being to provide a controlling device for such units which when used for the propulsion of vehicles, particularly aircraft, also may be used for braking and reversing the movement of the vehicles.

According to a feature of the invention the unit is provided at one end or both ends with means for adjusting the area of passage for the gases and/or the direction of flow thereof through the unit, said means comprising a grid formed of blades or laminae which is traversed by the gases and in which the size and/or the direction of the spaces traversed by said gases may be adjusted by a simultaneous or parallel turning of the individual grid elements, hereinafter referred to as laminae.

In a preferred embodiment of the invention the grid laminae are displaced with relation to each other in the longitudinal direction of the unit, preferably so that the axes of rotation of the individual laminae are situated in a staggered relation to each other along a straight line or lines forming such an (acute) angle with the longitudinal direction of the unit as to allow the laminae to be turned in parallel with each other to any position desired. In case of a unit for the jet propulsion of vehicles the laminae may be turned in parallel independently of each other from a position corresponding to a minimum of load to a position corresponding to a maximum of load in forward running and to a position for discharging the exhaust gases in a direction to effect a braking or reversing action on the movement of the unit.

In the accompanying drawings several embodiments of the invention are illustrated. Fig. 1 is a diagrammatic view showing two different adjustments for controlling purposes of two adjacent laminae of the outlet grid. Fig. 2 illustrates the same or two similar laminae as set to position for full admission and braking operation, respectively. Fig. 3 shows an example of a control mechanism for grid laminae. Figs. 4 and 5 show side elevation and plan view, respectively, of a unit mounted in the tail portion of an aircraft.

The numeral 1 designates the rotor of the jet propulsion unit the various elements of which, however, are not shown, as they may be of any well-known or suitable kind. The unit carries a plough-shaped laminated outlet grid designated by 3 and inlet grids designated by 2. The plough-shaped grid comprises two plane grids the central planes of which form an acute angle with each other. In each of said plane grids the individual laminae may rotate about transverse shafts which are positioned at equal distances apart in the central plane of the grid. Said distances are so selected with reference to the radial extension of the laminae as to allow the laminae upon a simultaneous or parallel rotation thereof to be adjusted to any angular position desired from a completely open position to a position giving a minimum of total area of passage as well as to positions for braking and reversing purposes. The said last-mentioned adjustments may, of course, only be realized in respect of the outlet grid. In transition from forward running to backward running, or vice versa, the laminae may be turned beyond each other.

By adjustment of the grid laminae into different angular positions the area of passage and the amount of air or gases passing therethrough both at forward running and backward running, as well as at braking operation, may be regulated. The adjustment of the outlet laminae in respect of the forward running is indicated in Fig. 1. In this figure I have shown in full lines a position of two laminae 3 as set for a small area of passage or a small amount of exhaust gases. In dotted lines I have shown a position of the laminae as set for a larger area of passage or a larger amount of exhaust gases. The arrows $b_1$ and $b_2$ indicate the directions of flow in both of said positions. The line $g$—$g$ represents the central plane of the grid. The arrow $a$ indicates also in this figure the direction of movement of the unit. As will appear from the drawing, the two arrows $b_1$ and $b_2$ form an angle with the direction of movement $a$. It is thus seen that at the same time that the area of passage is adjusted, an adjustment of the direction of exhaust gas discharged will be obtained, said direction being most efficient when opposite to the direction $a$. This optional direction of discharge is indicated by the arrow $c_1$ in Fig. 3 and has reference to the position shown in full lines which corresponds to full jet propulsion forward running. The position shown by dotted lines in the same figure in which the direction of discharge is that indicated by the arrow $c_2$ yields a braking action, inasmuch as the discharge of the exhaust takes place in an oblique forward direction, thereby producing a rearwardly acting, that is to say, braking power. If the aircraft has no forward running to be braked, or after its forward running is stopped by braking, the position $c_2$ will result in a backward running.

The regulation of the load of the unit will be especially economical due to the fact that the inlet and outlet areas for the gases at all loads may maintain their proportion with relation to each other or be regulated to the proportion which is considered the most economical one under various conditions. The relative displacement of the laminae, the size of their cross-section, and the placing of the shafts thereof with relation to the cross section should be so chosen that the rotation of the laminae will be balanced to the greatest extent possible so as to require a minimum of power for effecting the rotation.

By effecting a throttling in the grid 2, that is to say, throttling the inlet to the compressor of the unit, there is obtained as in usual aircraft compressors larger gas volumes and improved working conditions for the respective motor at low loads. The outlet grid 3 permits, as is well-known from the steam turbine art, an economic expansion of the exhaust gases also at a super-critical speed. The super-critical gas velocities may be utilized even at a reduced gas volume and low loads, provided the inlet and outlet grids of the unit are so set as to adjust the inlet and outlet areas for the same pressure and the same temperature in the combustion chamber.

The controlling device applied should, therefore, increase the efficiency and the security of operation of the unit in a high degree, especially at low loads.

The use of the invention for braking and backward running purposes in connection with aircraft widens the field of use of jet propulsion units for starting and landing purposes as well as for manoeuvring on air fields which otherwise would not be sufficiently large.

The grid laminae may be controlled by any suitable means. In Fig. 2 I have shown an example of such means. Fastened to the shaft 6 of the grid laminae is a pinion 7 meshing on opposite sides with two racks 8 adapted for moving in opposite directions, said racks and said pinion being all enclosed in a tube 9. The racks may be operated, for instance, by means well known in the aircraft art, as servomotors or manually operated means.

Air for cooling purposes mixed with oil dust or graphite particles may be passed through the surrounding tubes, unless a circulation of oil therethrough is required as a protection against undue heating of the outlet grid.

The control mechanism shown permits an independent adjustment of separate groups of grids, whereby the manoeuvring on the air field is rendered more easy.

Figs. 4 and 5 are side elevation and plan view, respectively, of the tail portion 12 of an aircraft having a jet propulsion unit 1 built therein and having further inlet grids 2 on its left hand and right hand sides and outlet grids 3 on its upper and lower sides.

The laminae may be divided in two or more lengths with associated intermediate bearings in case of large dimensions.

A grid arrangement according to the invention may be applied either only to the gas inlet or only to the gas outlet. In such case the missing grid may be replaced by any well-known mechanism of other kind.

With reference to Figs. 4 and 5 of the drawings it is further to be noted that these figures have also for their purpose to show examples of the feature of the invention according to which the grid shaped controlling elements may be so positioned as to permit the use of such controlling elements in connection with any mounting desired of jet propulsion units in aircraft or other vehicles.

In carrying out the invention on these lines the axes of rotation of the grid laminae should be situated in those planes which are best suited hereto in each individual case without rendering the grid laminae of the outlet grid of the unit in any way dependent on the placing of the axes of the laminae in the inlet grid of the unit. In the preferred arrangement shown in said figures the axes of the grid laminae at the outlet end of the unit are placed in horizontal plane while those of the laminae at the inlet end of the unit are placed in vertical planes.

What I claim is:

A jet propulsion unit for aircraft comprising in combination, an aircraft body having a tail portion, driving machinery mounted in said tail portion, said tail portion having inlet openings formed in opposite side surfaces thereof, means for conveying air from the inlet openings to the driving machinery, grid laminae rotatably mounted about vertical axes in said openings for controlling the rate of flow of air to the driving machinery, the said portion having other openings in its upper and lower surfaces, means for conveying gases discharged from the driving machinery to said other openings, and grid laminae rotatably mounted about horizontal axes in said last-mentioned openings for controlling the expelling of gases through the respective openings.

BIRGER LJUNGSTRÖM.

REFERENCES CITED

The following references are of record in the file of this patent:

UNITED STATES PATENTS

| Number | Name | Date |
| --- | --- | --- |
| 1,772,196 | Wallace | Aug. 5, 1930 |
| 1,800,794 | Hartman | Apr. 14, 1931 |
| 1,893,995 | Jung | Jan. 10, 1933 |
| 1,922,167 | Leray | Aug. 15, 1933 |
| 2,280,835 | Lysholm | Apr. 28, 1942 |

FOREIGN PATENTS

| Number | Country | Date |
| --- | --- | --- |
| 100,743 | Australia | Apr. 7, 1937 |
| 342,260 | Great Britain | Jan. 21, 1931 |